United States Patent

Lam et al.

[11] Patent Number: 5,355,452
[45] Date of Patent: Oct. 11, 1994

[54] DUAL BUS LOCAL AREA NETWORK INTERFACING SYSTEM

[75] Inventors: Roger T. Lam, Sacramento; Brandon H. Mathew; Matthew P. Wakeley, both of Roseville, all of Calif.

[73] Assignee: Hewlett-Packard Company, Palo Alto, Calif.

[21] Appl. No.: 907,955

[22] Filed: Jul. 2, 1992

[51] Int. Cl.[5] ............................................. G06F 13/00
[52] U.S. Cl. .................................... 395/200; 395/325; 364/DIG. 1; 364/242.94; 364/242.95
[58] Field of Search ................ 395/325, 250, 200, 275, 395/725; 370/85.1; 340/825.03

[56] References Cited

U.S. PATENT DOCUMENTS

| | | | |
|---|---|---|---|
| 4,313,162 | 6/1982 | Baun et al. | 395/250 |
| 4,672,570 | 6/1987 | Benken | 395/200 |
| 4,715,030 | 12/1987 | Koch et al. | 370/85 |
| 4,750,114 | 6/1988 | Hirtle | 395/250 |
| 4,787,082 | 11/1988 | Delaney et al. | 370/85 |
| 4,908,823 | 5/1990 | Haagens et al. | 370/85.1 |
| 5,001,707 | 3/1991 | Kositpaiboon et al. | 370/94.1 |
| 5,103,446 | 4/1992 | Fischer | 370/85.1 |
| 5,206,936 | 4/1993 | Holland et al. | 395/325 |
| 5,226,120 | 7/1993 | Brown et al. | 395/200 |
| 5,235,597 | 8/1993 | Himwich et al. | 370/110.1 |
| 5,239,632 | 8/1993 | Larner | 395/325 |

Primary Examiner—Allen R. MacDonald
Assistant Examiner—Ayaz R. Sheikh

[57] ABSTRACT

An improved local area network interfacing system. The inventive system includes a frontplane circuit for connecting the interfacing system to a local area network and a backplane circuit for connecting the interfacing system to a host. A first internal bus is included for providing communication between the backplane circuit and the frontplane circuit. A processor is included for controlling the operation of the interfacing system. A second internal bus is included for providing communication between the processor and associated memory. An internal bus control circuit facilitates and controls communication between the first internal bus and the second internal bus. The dual internal busses of interfacing system of the present invention afford high speed operation with an inexpensive processor by allowing for input and output operations to be completed without being impeded by processor operations.

10 Claims, 6 Drawing Sheets

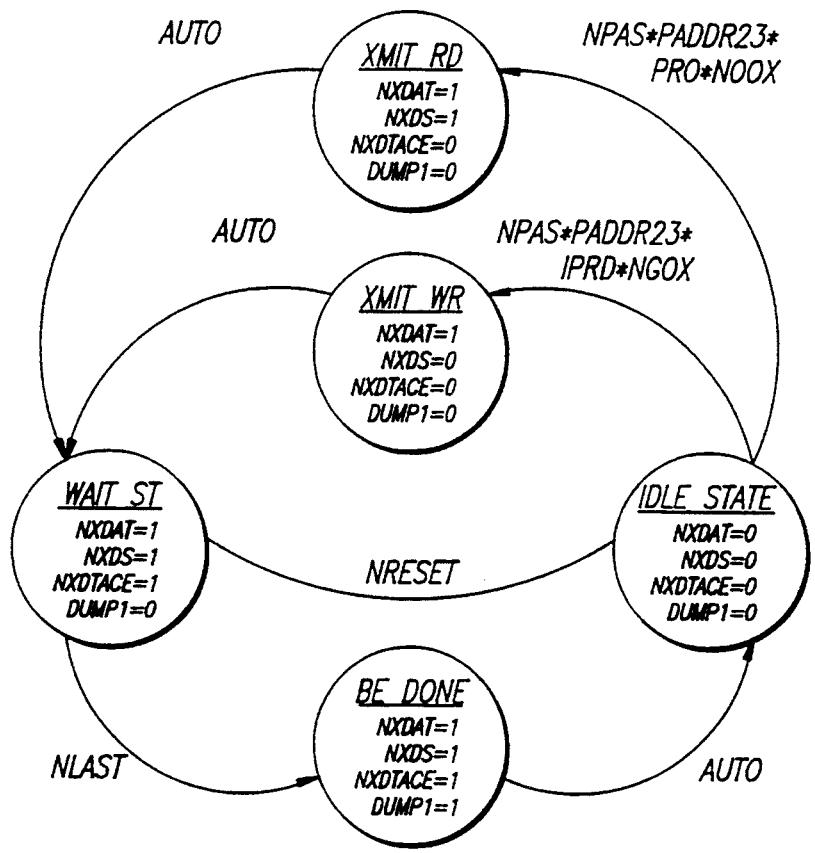
FIG. 5 ACROSS BUS CONTROLLER BLOCK
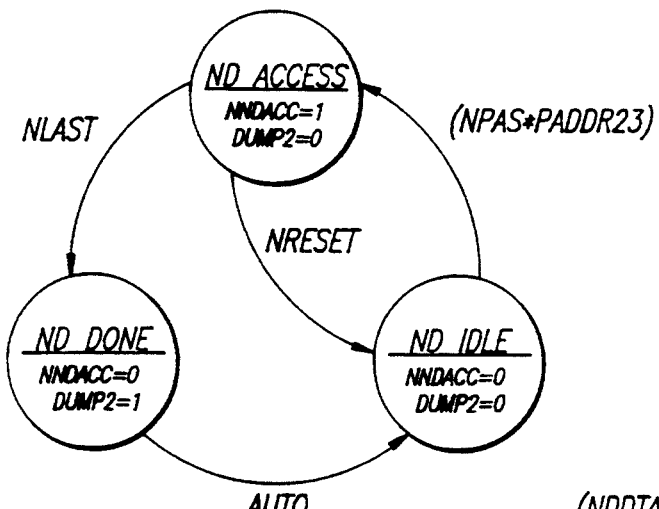
FIG. 4
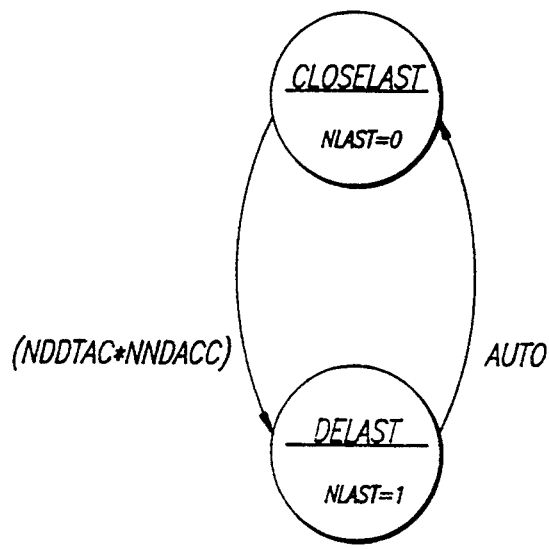
FIG. 8

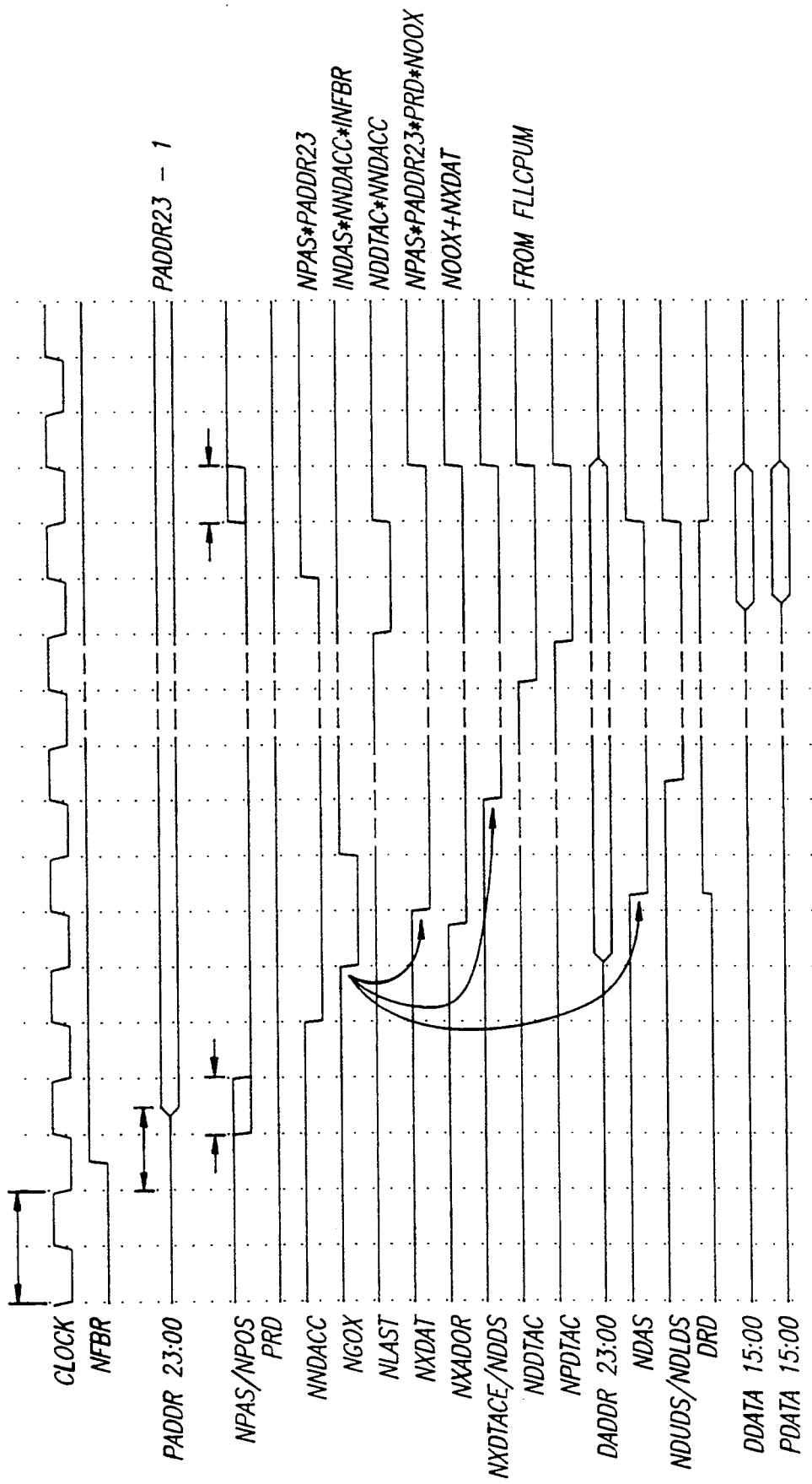
FIG. 9 ACROSS BUS READ CYCLE

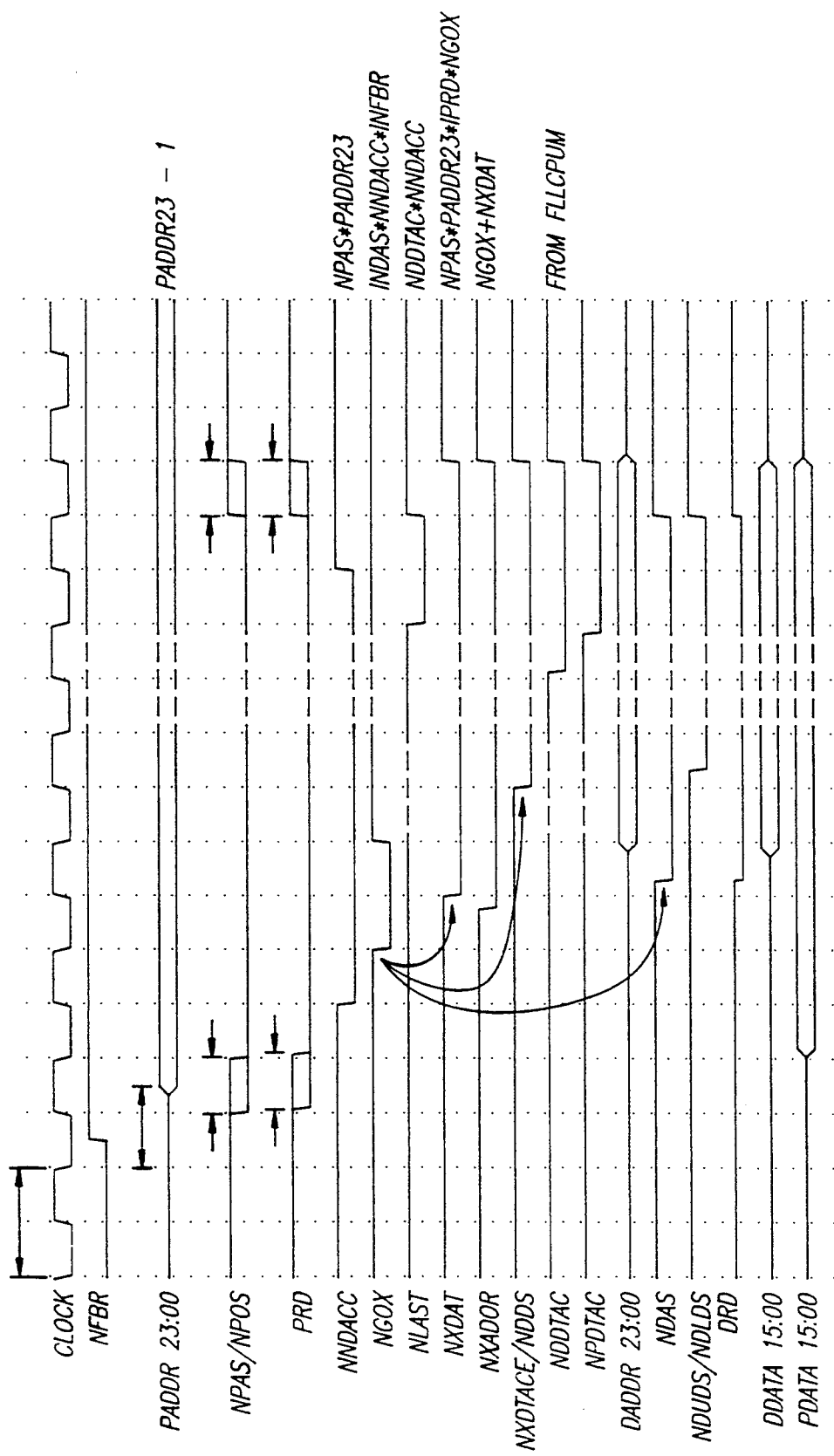

(56)

DUAL BUS LOCAL AREA NETWORK INTERFACING SYSTEM

BACKGROUND OF THE INVENTION

1. Field of the Invention

The present invention relates to local area networks (LANs). More specifically, the present invention relates to interfacing units for use with local area networks.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Local area networks (LANs) facilitate data communication between computing systems (such as a network of data terminal equipments, network workstations, personal computers, and the like, individually referred to hereinafter as a "host"). Currently, several types of LAN systems are used widely in the art. Most systems may be classified generally as either an Ethernet, Token Ring, or 10 Base T type local area network.

The Ethernet system is characterized by a coaxial cable which serves as a bus. The nodes of the system (e.g., terminals, printers and other devices) are connected to the cable and assigned a unique address.

A Token Ring LAN is a circular network similar to the Ethernet system with the exception that a token is used to control access to the network. The token is a packet of signals that is passed from node to node. The node that has the token has control of the network with respect to the transmission of data to other nodes. When the node has completed a transmission, the token is released for acquisition by another node.

The 10 Base T local area network is characterized by the use of a pair of twisted wires as a connector between nodes arranged in a star configuration around a controlling hub.

With each system, an interface is required between the network and the host. The interface typically includes a frontplane for connection to the network and a backplane for connection to the host. Conventional local area network interfaces typically include a microprocessor and a single internal bus. The microprocessor typically ties up the internal bus for instruction fetch and execution operations. This precludes the use of the bus for input and output (I/O) operations thereby slowing the operation of the system.

Some interfaces have been equipped with more powerful processors which tend to be less restrictive on I/O operations. However, these processors are expensive and typically require extensive, costly changes in the architecture of the interfacing system.

Accordingly, there is a need in the art for a fast and inexpensive system for interfacing a local area network to host.

SUMMARY OF THE INVENTION

The need in the art is addressed by the present invention which provides an improved local area network interfacing system. The inventive system includes a frontplane circuit for connecting the interfacing system to a local area network and a backplane circuit for connecting the interfacing system to a host. A first internal bus is included for providing communication between the backplane circuit and the frontplane circuit. A processor is included for controlling the operation of the interfacing system. A second internal bus is included for providing communication between the processor and associated memory. An internal bus control circuit facilitates and controls communication between the first internal bus and the second internal bus.

The dual internal busses of the interfacing system of the present invention afford high speed operation with an inexpensive processor by allowing for input and output operations to be completed without being impeded by processor operations,

BRIEF DESCRIPTION OF THE DRAWINGS

FIG. 4 is a state diagram of the ND ACCESS state machine of the second midplane controller of the dual bus local area network interfacing system of the present invention.

FIG. 5 is a state diagram of the read/write state machine of the Across Bus Control Logic of the second midplane controller of the dual bus local area network interfacing system of the present invention.

FIG. 8 is a state diagram of the LASTCYCLE state machine of the Across Bus Control Logic of the second midplane controller of the dual bus local area network interfacing system of the present invention.

FIG. 9 is a timing diagram for an across bus read cycle of the dual bus local area network interfacing system of the present invention.

FIG. 10 is a timing diagram for an across bus write cycle of the dual bus local area network interfacing system of the present invention.

DESCRIPTION OF THE INVENTION

Illustrative embodiments and exemplary applications will now be described with reference to the accompanying drawings to disclose the advantageous teachings of the present invention.

Figure 1:
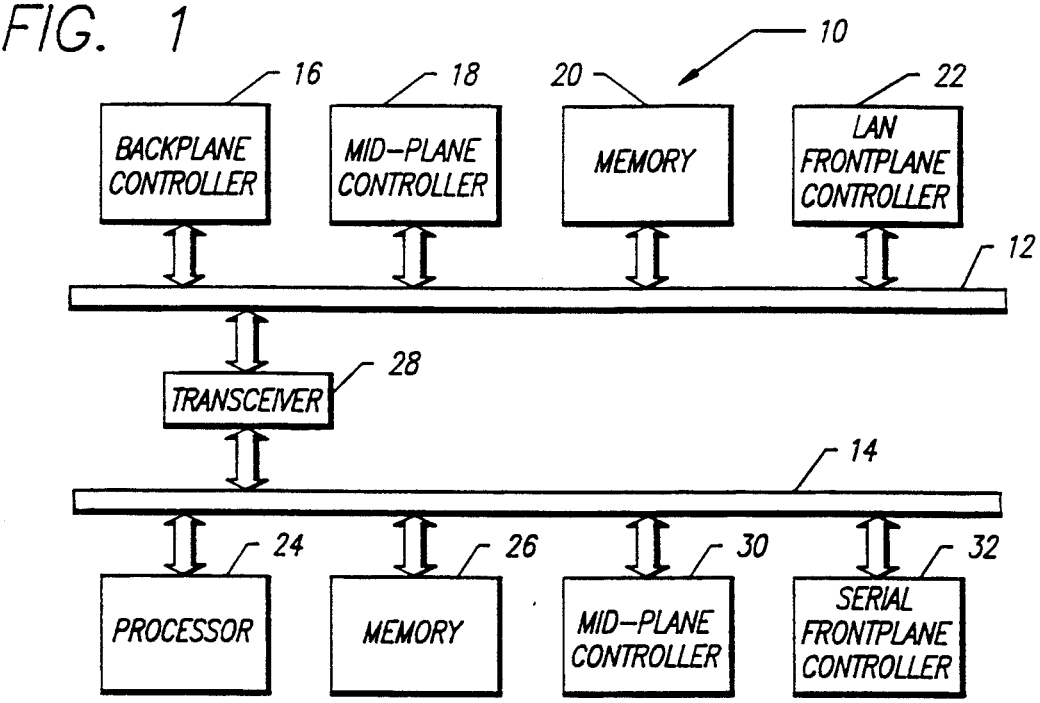
FIG. 1 is a simplified block diagram of the dual bus local area network interfacing system of the present invention.

FIG. 1 is a simplified block diagram of the dual bus local area network interfacing system 10 of the present invention. The system 10 includes a first internal bus 12 and a second internal bus 14. In the illustrative embodiment, the first bus is a direct memory access (DMA) bus and the second bus 14 is a processor bus.

A conventional backplane controller 16, first midplane controller 18, memory 20 and local area network frontplane controller 22' are attached to the DMA bus 12. A processor 24, memory 26, second midplane controller 30 and serial frontplane controller 32 are attached to the processor bus 14. As discussed more fully below, communication between the DMA bus 12 and the processor bus 14 is provided by via a conventional transceiver 28 under control of the second midplane controller 30, the processor 24, memory 26 and serial frontplane controller may be of conventional design.

As discussed more fully below, the dual bus architecture of the LAN interfacing system of the present invention affords high speed operation with a simple and inexpensive architecture. The advantageous operation of the present invention derives from location of the bus intensive processor on a separate bus. This allows for processor operations to be executed without interference with LAN I/O operations. Communication between busses is facilitated through the transceiver 28 under the control of the second midplane controller 30, a bus arbiter as discussed more fully below.

Figure 2:
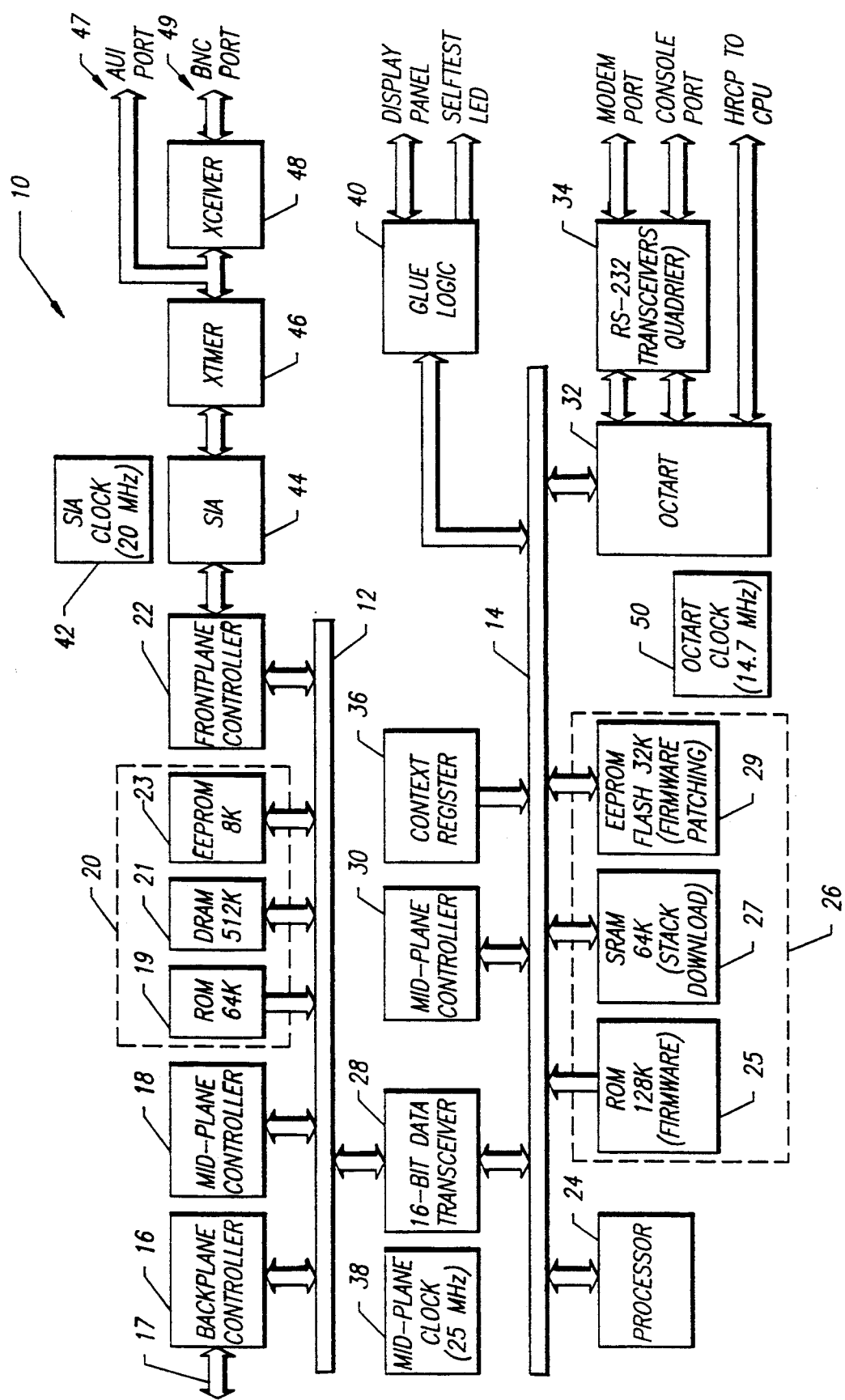
FIG. 2 is a detailed block diagram of the dual bus local area network interfacing system of the present invention.

FIG. 2 is a detailed block diagram of the dual bus local area network interfacing system 10 of the present invention. The backplane controller 16 is a conventional application specific integrated circuit (ASIC) that arbitrates between the DMA bus 12 and a backplane bus 17. The first midplane controller 18 arbitrates traffic on the DMA bus 12 in a conventional manner. The memory 20 includes read-only memory (ROM) 19 which stores I/O dependent identification code for the system 10, dynamic random access memory DRAM 21 which acts as a data buffer, and an electrically erasable programmable read-only memory (EEPROM) 23 which stores special parameters such as baud rate, password and etc. The frontplane controller 22 is a conventional LAN controller suitable for the IEEE 802.3 standard for example. The frontplane controller 22 is connected to the LAN by a serial interface adapter 44 (SIA), a transformer 46 and a transceiver 48 via a BNC port 49 an AUT port 47 to an external transceiver.

On the processor bus 14, the memory 26 is implemented with ROM 29 which stores instructions for the processor 24, static random access memory (SRAM) 27, and EEPROM 29 for bug fixes, updates and etc. The serial frontplane controller 32 is implemented with an octant, an eight port universal asynchronous receiver-transmitter (UART) which communicates with a terminal or console through an RS-232 port 34. A context register 36 stores information relating to the status of the octant 32. Glue logic 40 provides signals for a display panel (not shown) relating to host processor activity, external controls, etc.

As mentioned above, communication between the internal I/O DMA communication bus 12 and the internal processor bus 14 is arbitrated by the second midplane controller 30 via the transceiver 28.

Figure 3:
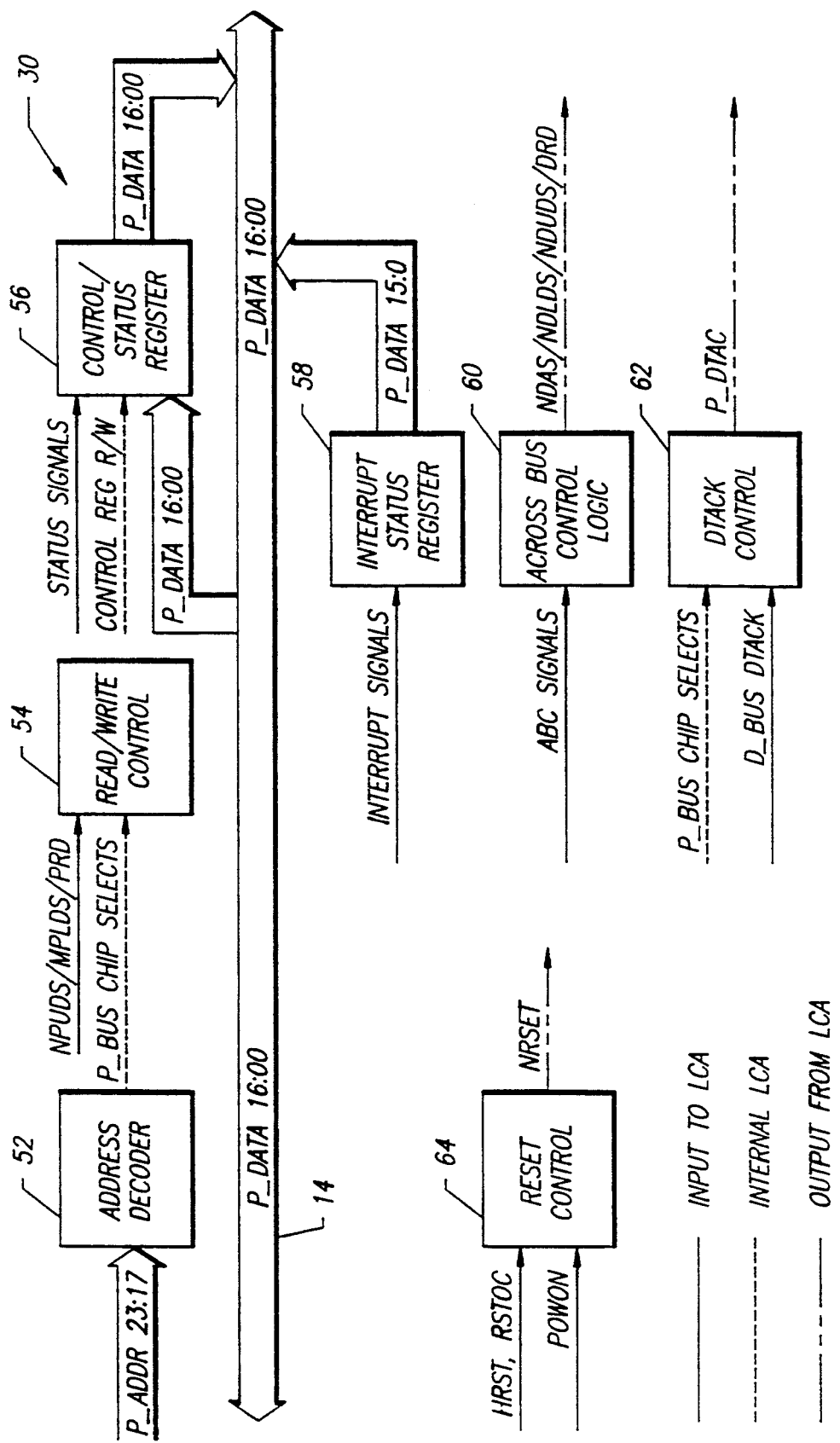
FIG. 3 is a functional block diagram of an illustrative implementation of the second midplane controller of the dual bus local area network interfacing system of the present invention.

FIG. 3 is a functional block diagram of an illustrative implementation of the second midplane controller 30 of the dual bus local area network interfacing system of the present invention. The second midplane controller 30 includes an address decoder 52, read/write control 54, a control/status register 56, an interrupt status register 58, across bus control logic 60, DTACK control 62 and reset control 64. With the exception of the across bus control logic 60, the functional elements of the second midplane controller 30 are of conventional design.

The across bus control logic 60 is the central functional element of the second midplane controller 30. In the illustrative embodiment, the across bus control logic 60 consists of two registered programmable logic array (PAL) circuits.

The first PAL is denominated as Across Bus Controller Block and generates signals needed to allow the processor 24 to "go across" to the DMA bus 12. The Across Bus Controller Block includes two state machines "ND ACCESS" and "READ/WRITE".

FIG. 4 is a state diagram of the ND ACCESS state machine. Initially, the machine is in the idle state. In the illustrative implementation, when the highest bit of an address is a logical "1", a signal is provided that the processor 24 is attempting to access the DMA bus 12. By asserting the address strobe (NPAS) and processor address 23 (PADDR23), the processor 24 signals for across bus access. Thus, by monitoring the processor address strobe "NPAS" and the processor address line 23 "PADDR23" the state machine will know when to transition from the idle state to the ND ACCESS state. The outputs of the machine are shown within the circles. On transition from the idle state to the need access state, the NNDACC output goes from high to low to signal other state machines that this particular state machine has detected that the processor needs to access the DMA bus 12.

In the ND ACCESS state, the ND ACCESS machine looks for NLAST, a signal from another state machine which determines if the current cycle is the last one of a current access cycle. On receipt of an NLAST signal, the machine provides a dump signal DUMP2 and resets the need access signal NNDACC and transitions to the ND DONE state. Thereafter, the ND ACCESS state machine automatically transitions back to the idle state.

The state diagram of the read/write state machine of the first PAL of the Across Bus Control Logic of the second midplane controller is shown in FIG. 5. It controls the data transceivers and address latches between the DMA bus and the processor bus. The data bus goes from the processor side to the DMA side during a write access and vice versa during a read access. This state machine will keep controlling the DMA bus until NLAST is asserted.

Figure 6:
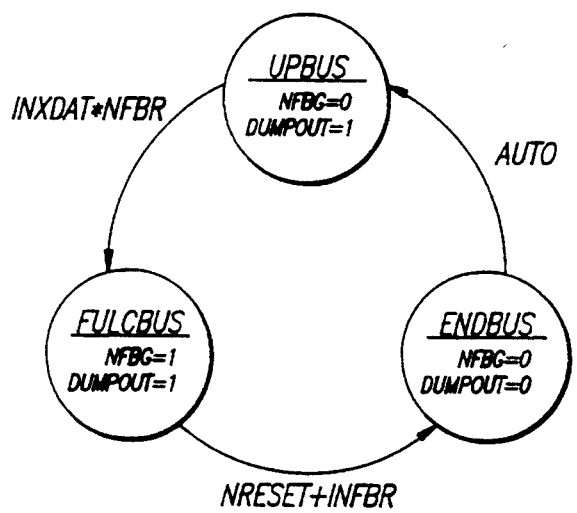
FIG. 6 is a state diagram of the WHOBUS state machine of the Across Bus Control Logic of the second midplane controller of the dual bus local area network interfacing system of the present invention.
Figure 7:
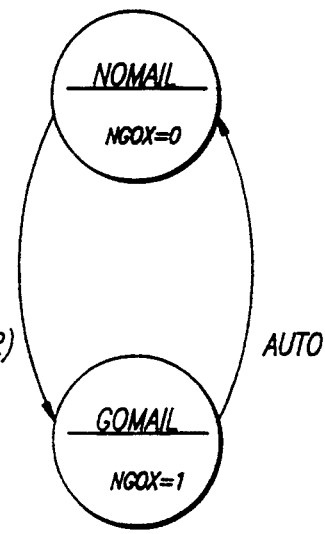
FIG. 7 is a state diagram of the TRANSFER state machine of the Across Bus Control Logic of the second midplane controller of the dual bus local area network interfacing system of the present invention.

The second internal PAL of the across bus control logic 60 contains three state machines "WHOBUS", "TRANSFER" and "LASTCYCLE". FIGS. 6, 7, and 8 are state diagrams of the WHOBUS, TRANSFER and LASTCYCLE state machines respectively. Each state machine is clocked by a negative clock. A negative clock is a clock signal that triggers on the trailing edge thereof. The negative clock is used to minimize the across bus access time.

The WHOBUS state machine determines which component has control of the DMA bus. (No component connected to the DMA bus may access the processor bus.) The WHOBUS state machine guarantees that the first midplane controller 18 will not attempt to use the DMA bus 12 when the processor 24 is transferring information across the DMA bus. In FIG. 6, the idle state is UPBUS for microprocessor bus. Ordinarily, the processor 24 has control of the DMA bus 12. When access to the bus is requested through the first midplane controller 18, the request is handled by the second midplane controller 30. This is illustrated in the state diagram of FIG. 6. In FIG. 6, the idle state is UPBUS for microprocessor owning the DMA bus. When the first midplane controller bus request signal NFBR is active and an active no data transmission signal !NXDAT is high (as indicated by an exclamation mark "!") no across bus access is taking place, the bus is placed under the control of the first midplane controller 18 and the machine transitions to the FULBUS state. The NFBG (bus granted) signal is set high and DUMPOUT signal is set high permitting data transfers on the DMA bus. When the first midplane controller removes the bus request, NFBR and DUMPOUT are reset and the machine transitions to the ENDBUS state and the processor 24 is allowed to reacquire the DMA bus 12.

As illustrated in FIG. 7, the TRANSFER state machine generates a signal (NGOX) which indicates that across bus transfers are permissible. This drives the READ/WRITE state machine and generates the signals to enable the address and data transceivers (NXDAT, NXDS, NXDATA, NXADDR). This state machine is designed to provide a single clock pulse signal for notifying the READ/WRITE state machine that it can start the across bus cycle.

Next, as illustrated in FIG. 8, the LASTCYCLE state machine waits to see the DMA acknowledge data with a !NDDTAC. When this signal is true and the need access signal NNDACC signal is true, LASTCYCLE state machine transitions from the idle CLOSELAST state to the DELAST state. Once NDDTAC is generated, the signal NLAST is generated on the falling edge. NLAST drives the ND ACCESS state machine to de-assert NNDACC on the next rising edge clock pulse.

The operation of the present invention is appreciated with the state diagrams in conjunction with FIGS. 9 and 10. FIG. 9 is a timing diagram for an across bus read cycle of the dual bus local area network interfacing system of the present invention. FIG. 10 is a timing diagram for an across bus write cycle of the dual bus local area network interfacing system of the present invention.

In FIG. 9, the processor asserts the address strobe NPAS and the data strobe NPDS when across bus read access is commanded. By decoding the address lines and detecting a logical "1" at the highest address bit, an across bus cycle may be detected by the ND-ACCESS state machine so the need access signal NNDACC is asserted. Half a clock pulse later, the NGOX signal goes low (active) and signals other state machines that across bus transfers are permissible on subsequent clock pulses as is indicated by the arrows on the diagram. That is, when data is transmitted across the bus, NXDAT is active which turns on the transceiver 28. NXADDR is a signal to place the address on the bus and etc. After these and other signals are presented, the slave devices should respond. A short time later, a DMA DTAC signal (e.g., NDDTAC) is asserted which indicates that data is available on the bus for the processor. This signal passes through the transceiver 28 and becomes NPDTAC for the processor. The processor captures the data, removes the bus request and the NLAST signal is generated with detection of a DTACK signal on the DMA bus which frees the DMA bus. These activities are represented by the topmost state of the READ/WRITE state diagram of FIG. 5.

Write operations are depicted in the timing diagram of FIG. 10. Write operations are essentially the same as read operations with the exception that instead of waiting for data to come in on the data bus, data is placed on the data bus.

Returning to FIG. 3, the address decoder 52 decodes addresses in a conventional manner. The read/write controller 54 generates chip selects and provides read and write signals to the ROM and SRAM to provide control signals to memory. The DTACK controller is a state machine for notifying the processor when data are available from different devices with unique associated waits states. The remaining elements, i.e., control status register, interrupt status register and reset control are of conventional design and function.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. An interface system for providing an interface between a local area network and a host, said system comprising:

a first bus;

backplane controller means, connected to said first bus, for interfacing said first bus to said host;

a second bus;

frontplane controller means, connected to said first and second bus, for interfacing said local area network to said first bus and said second bus, respectfully;

processing means for controlling communication between said first bus and said second bus;

transceiver means, connecting said first bus to said second bus for allowing communication between said first bus and said second bus; and midplane controller means connected to said second bus for allowing said processing means to determine the status of activity on said first bus by communicating directly with said midplane controller means.

2. The invention of claim 1 wherein said midplane controller means includes logic means for generating signals to allow the processor to access said first bus.

3. The invention of claim 2 wherein said logic means includes means for determining whether said frontplane controller means or said backplane controller means has control of said first bus.

4. The invention of claim 3 wherein said logic means includes means for generating a signal that indicates that communication between busses is permissible.

5. The invention of claim 4 wherein said logic means includes means for receiving an acknowledgement signal from said first bus.

6. The invention of claim 1 further including a first memory connected to said second bus.

7. The invention of claim 6 further including means for controlling data communication between the frontplane controller and the backplane controller.

8. The invention of claim 7 further including a second memory connected to said first bus.

9. The invention of claim 8 further including means connected to said second bus for permitting access to said interfacing system and managing traffic therethrough.

10. A system for providing an interface for a local area network with a host, said system comprising:

a first bus;

frontplane controller means connected to said first bus for interfacing said local area network to said first bus;

backplane controller means connected to said first bus for interfacing said first bus to said host;

status means connected to said first bus for generating signals indicative of the status of activity on said first bus;

a second bus;

transceiver means connected between said first bus and said second bus for interfacing said first bus to said second bus, said transceiver means including means for receiving signals from said status means indicative of the status of activity on said first bus;

a processor connected to said second bus; and midplane controller means connected to said second bus for controlling said transceiver means to communicate said signals from said transceiver to said midplane controller means, said midplane controller means further including means responsive to said processor for communicating at least one of said signals from said midplane controller means to said processor and thereby communicate the status of activity on said first bus to said processor.

* * * * *